United States Patent
Kumamoto et al.

(10) Patent No.: US 7,799,866 B2
(45) Date of Patent: Sep. 21, 2010

(54) METHOD FOR PRODUCING PROPYLENE-ETHYLENE BLOCK COPOLYMER

(75) Inventors: Shin-ichi Kumamoto, Ichihara (JP);
Noriyuki Satou, Kisarazu (JP); Masaki Endo, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/341,039

(22) Filed: Dec. 22, 2008

(65) Prior Publication Data
US 2009/0171019 A1 Jul. 2, 2009

(30) Foreign Application Priority Data
Dec. 28, 2007 (JP) .................. P2007-340413

(51) Int. Cl.
 C08F 297/00 (2006.01)
 C08F 297/08 (2006.01)
 C08F 2/34 (2006.01)
(52) U.S. Cl. .................................... 525/53; 525/323
(58) Field of Classification Search .................. 525/53, 525/106, 323
See application file for complete search history.

(56) References Cited

U.S. PATENT DOCUMENTS

| | | | |
|---|---|---|---|
| 3,652,527 A | 3/1972 | Trieschmann et al. | |
| 3,957,448 A | 5/1976 | Shepard et al. | |
| 3,971,768 A | 7/1976 | Peters et al. | |
| 4,129,701 A | 12/1978 | Jezl et al. | |
| 4,339,557 A | 7/1982 | Hasuo et al. | |
| 4,751,265 A | 6/1988 | Asanuma et al. | |
| 4,808,667 A * | 2/1989 | Goko et al. | 525/247 |
| 5,473,021 A * | 12/1995 | Koura et al. | 525/247 |
| 5,672,658 A | 9/1997 | Oka et al. | |
| 6,355,725 B2 | 3/2002 | Terano et al. | |
| 6,576,710 B1 | 6/2003 | Huovinen et al. | |
| 6,646,044 B1 * | 11/2003 | Watanabe et al. | 525/53 |

FOREIGN PATENT DOCUMENTS

JP 41-12916 B 7/1966

(Continued)

OTHER PUBLICATIONS

Search Report from Intellectual Property Office of Singapore for Singapore Application No. 0809582-0, dated Jun. 5, 2009.

*Primary Examiner*—Fred M Teskin
(74) *Attorney, Agent, or Firm*—Sughrue Mion, PLLC

(57) ABSTRACT

The method for producing a propylene-ethylene block copolymer in accordance with the present invention has: a first polymerization process which is performed using two or more polymerization tanks connected in series and in which a solid catalyst or a prepolymerized catalyst containing a solid catalyst, and propylene are continuously supplied to a first polymerization tank; and a second polymerization process in which propylene, ethylene, and polypropylene particles continuously extracted from the last polymerization tank of the first polymerization process are supplied to a polymerization tank to produce a propylene-ethylene block copolymer, wherein the average retention time of the polypropylene particles in each polymerization tank of the first polymerization process is 0.1 to 1.5 h and the sum total of average retention times of polypropylene particles in the polymerization tanks of the first polymerization process is 1.5 to 3.0 h.

2 Claims, 2 Drawing Sheets

FOREIGN PATENT DOCUMENTS

| | | |
|---|---|---|
| JP | 46-11670 B | 3/1971 |
| JP | 46-31969 | 9/1971 |
| JP | 47-42379 B | 10/1972 |
| JP | 58-201802 A | 11/1983 |
| JP | 59-21321 B2 | 5/1984 |
| JP | 59-126406 A | 7/1984 |
| JP | 61-101511 A | 5/1986 |
| JP | 2-233708 A | 9/1990 |
| JP | 3-84013 A | 4/1991 |
| JP | 4-6725 B2 | 2/1992 |
| JP | 6-136018 A | 5/1994 |
| JP | 9-316146 A | 12/1997 |
| JP | 10-168142 A | 6/1998 |
| JP | 2002-265516 A | 9/2002 |
| JP | 2004-262993 A | 9/2004 |
| JP | 2005-220235 A | 8/2005 |

\* cited by examiner

METHOD FOR PRODUCING PROPYLENE-ETHYLENE BLOCK COPOLYMER

BACKGROUND OF THE INVENTION

1. Field of the Invention

The present invention relates to a method for producing a propylene-ethylene block copolymer.

2. Related Background Art

Because polypropylene resins used for automotive components, home electronic products, and the like are required to have high rigidity and high impact resistance, propylene block copolymers having a crystalline propylene polymer portion and an amorphous propylene polymer portion are typically used therefor. The propylene block copolymers are mainly produced by a method including a first polymerization process in which propylene is homopolymerized and a subsequent second polymerization process in which propylene and ethylene are copolymerized. More specifically, a method by which both the first polymerization process and the second polymerization process are performed by batch polymerization (see, for example, Japanese Patent Application Laid-open No. 6-136018), a method by which the first polymerization process is performed by continuous polymerization and the second polymerization process is performed by batch polymerization (see, for example, Japanese Patent Application Laid-open No. 61-101511), and a method by which both the first polymerization process and the second polymerization process are performed by continuous polymerization (see, for example, Japanese Patent Application Laid-open No. 10-168142) are known.

SUMMARY OF THE INVENTION

From the standpoint of cost efficiency, it is preferred that the aforementioned propylene block copolymers (multistage-polymerized propylene-based copolymers) be produced by continuous polymerization rather than by batch polymerization. However, in the conventional continuous polymerization method a short path is likely to occur via which polymer particles that have not grown sufficiently are discharged from the reaction tank, or overgrown polymer particles are likely to be accumulated inside the reaction tank. Due to such structural heterogeneity of the obtained polymer particles, circular defects, which are called "fisheyes" because of their similarity to the shape of a fisheye, easily occur in molded products and there is room for improvement in terms of product appearance and mechanical strength.

The present invention was created in view of the foregoing, and it is an object of the present invention to provide a method for producing, by continuous polymerization, a propylene-ethylene block copolymer with a reduced number of fisheyes occurring in molded products.

The method for producing a propylene-ethylene block copolymer in accordance with the present invention has: a first polymerization process which is performed using two or more polymerization tanks connected in series and in which a solid catalyst or a prepolymerized catalyst containing a solid catalyst, and propylene are continuously supplied to a first polymerization tank to produce polypropylene particles containing the solid catalyst, and propylene and polypropylene particles continuously extracted from a former polymerization tank are continuously supplied to a second or following polymerization tank, so that each of the polypropylene particles is grown; and a second polymerization process in which propylene, ethylene, and polypropylene particles continuously extracted from the last polymerization tank of the first polymerization process are supplied to a polymerization tank to produce a copolymer of propylene and ethylene within the polypropylene particles, wherein the average retention time of the polypropylene particles in each polymerization tank of the first polymerization process is 0.1 to 1.5 h and the sum total of average retention times of polypropylene particles in the polymerization tanks of the first polymerization process is 1.5 to 3.0 h.

By the method in accordance with the present invention, when polypropylene particles are produced by propylene homopolymerization in the first polymerization process, the average retention time of polypropylene particles in each polymerization tank is within a specified range (0.1 to 1.5 h) and the sum total of average retention times of polypropylene particles in the polymerization tanks is within a specified range (1.5 to 3.0 h), whereby the retention time distribution of polypropylene particles in each polymerization tank of the first polymerization process can be sufficiently reduced and polypropylene particles which are sufficiently uniform in particle diameter can be obtained.

Because polypropylene particles which are sufficiently uniform in particle diameter are provided to the second polymerization process, it is possible to obtain a propylene-ethylene block copolymer which is sufficiently uniform in the ratio of a propylene polymer component grown in the first polymerization process, which is referred to hereinbelow as "homopropylene component", and a copolymer component grown in the second polymerization process, which is referred to hereinbelow as "propylene-ethylene component". Therefore, the number of fisheyes in a molded product using such a block copolymer can be sufficiently reduced.

Further, in accordance with the present invention, it is preferred that the weight of the propylene-ethylene block copolymer obtained through the second polymerization process is 20,000 to 40,000 parts by weight, where the amount of the solid catalyst supplied per unit time to the polymerization tank of the first stage is let be 1 part by weight. As described hereinabove, the present invention makes it possible to obtain polypropylene particles sufficiently uniform in particle diameter in the first polymerization process. As a result, the solid catalyst contained within the polypropylene particles after the first polymerization process is sufficiently uniform in catalytic activity. By growing a propylene-ethylene block copolymer till the produced amount reaches the aforementioned range in the subsequent second polymerization process, it is possible to obtain a propylene-ethylene block copolymer which is more uniform in the ratio of the homopropylene component to the propylene-ethylene component and more significant reduction in the number of fisheyes can be attained.

In accordance with the present invention, from the standpoint of further reducing the occurrence of fisheyes, it is preferred that the average retention time of the polypropylene particles in each polymerization tank of the first polymerization process be equal to or less than 1.2 h.

In accordance with the present invention, from the standpoint of further inhibiting the occurrence of fisheyes, it is preferred that a silicon compound represented by Formula [1] given below be supplied to the polymerization tank of the second polymerization process

    [1]

wherein, L independently in each occurrence represents a monovalent hydrocarbon group having 1 to 20 carbon atoms.

The average retention time of particles in a polymerization tank, as referred to in the description of the present invention, means a value obtained by dividing the weight (unit: kg) of particles contained within the polymerization tank by a mass flow rate (unit: kg/h) of particles extracted from the polymerization tank. Further, when the polymerization tank is a liquid-phase polymerization tank, the average retention time means a value obtained by dividing the amount of liquid (unit: $m^3$) contained in the polymerization tank by a volume flow rate (unit: $m^3/h$) of particle-containing liquid that is extracted from the polymerization tank.

The present invention makes it possible to produce, by continuous polymerization, a propylene-ethylene block copolymer from which a molded product having a reduced number of fisheyes can be produced.

DESCRIPTION OF THE PREFERRED EMBODIMENTS

In accordance with the present invention, the polymerization tanks of the first polymerization process contain two or more polymerization tanks. In order to obtain particles of a propylene-ethylene block copolymer which are more uniform in the ratio of the homopropylene component to the propylene-ethylene component and thereby reduce sufficiently the number of fisheyes appearing in a molded product, it is preferred that the polymerization tanks of the first polymerization process be 2 to 9, more preferably 3 to 7 polymerization tanks. The second polymerization process uses one or more polymerization tanks. In order to inhibit the formation of fisheyes in molded articles, it is preferred that 1 to 5, more preferably 1 to 3 polymerization tanks be used in the second polymerization process. If it is intended that mechanical properties and morphology are optimized by changing the propylene-ethylene component in structure, it is preferable that the second polymerization process be implemented by using a plurality of polymerization tanks rather than a single polymerization tank. The production of a propylene-ethylene block copolymer by performing propylene homopolymerization by using three tandem propylene polymerization tanks and then performing copolymerization of propylene and ethylene by using two tandem copolymerization tanks will be described, as a preferred embodiment of the present invention, below in detail with reference to the drawings. However, the present invention is not limited to the below-described embodiment.

Figure 1:
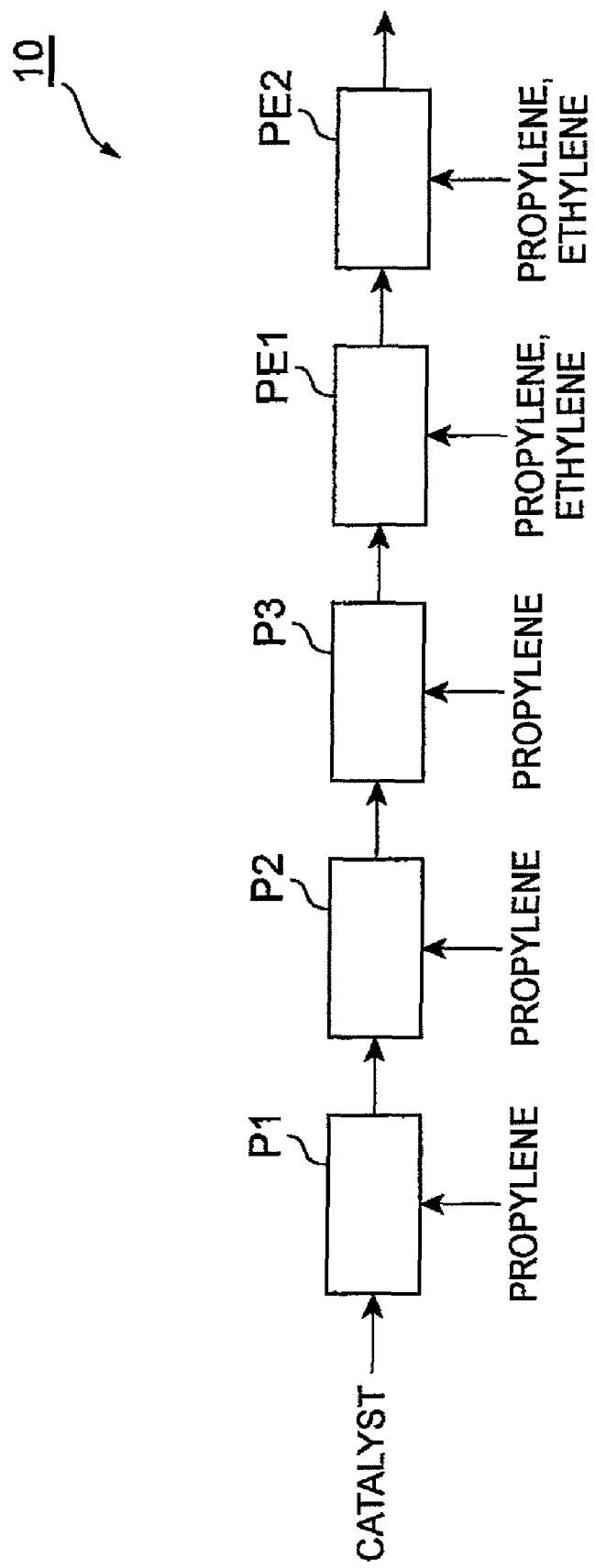
FIG. 1 is a schematic structural diagram illustrating a propylene-ethylene block copolymer production system.

A propylene-ethylene block copolymer production system 10 shown in FIG. 1 is a system for producing a propylene-ethylene block copolymer by continuous polymerization. The propylene-ethylene block copolymer production system 10 is provided with three propylene polymerization tanks P1, P2, P3 disposed on the upstream side and two copolymerization tanks PE1, PE2 disposed on the downstream side. The propylene polymerization tanks P1, P2, P3 and the copolymerization tanks PE1, PE2 are linked in series so that a product can be transferred successively from an upstream polymerization tank to a downstream polymerization tank. Further, to each of the propylene polymerization tanks P1, P2, P3 is connected a line for supplying propylene to the tank and to each of the copolymerization tanks PE1, PE2 is connected a line for supplying propylene and ethylene to the tank.

In the propylene-ethylene block copolymer production system 10, a solid catalyst and propylene are continuously supplied to the propylene polymerization tank P1 and polypropylene particles containing the solid catalyst are produced. Then, propylene and polypropylene particles continuously extracted from the propylene polymerization tank P1 are continuously supplied to the propylene polymerization tank P2, the polypropylene particles are grown. Then propylene and polypropylene particles continuously extracted from the propylene polymerization tank P2 are continuously supplied to the propylene polymerization tank P3, and the polypropylene particles are grown. This is the first polymerization process.

Propylene serving as a starting material has to be continuously supplied from the outside to the propylene polymerization tank P1, but if the untreated propylene is continuously supplied together with the polypropylene particles from an upstream propylene polymerization tank to a downstream propylene polymerization tank, it is not always necessary to supply propylene from the outside.

Polypropylene particles continuously extracted from the propylene polymerization tank P3, propylene, and ethylene are continuously supplied to the copolymerization tank PE1, and a copolymer of propylene and ethylene is produced inside the polypropylene particles. Then, particles continuously extracted from the copolymerization tank PE1, propylene, and ethylene are continuously supplied to the copolymerization tank PE2 and particles of a propylene-ethylene block copolymer are produced. This is the second polymerization process.

In the first polymerization process performed in the three tandem propylene polymerization tanks P1, P2, P3, the average retention time of polypropylene particles in each propylene polymerization tank is 0.1 to 1.5 h, and the sum total of average retention times of these propylene polymerization tanks P1, P2, P3 is 1.5 to 3.0 h. By adjusting the average retention time of the propylene polymerization tanks P1, P2, P3 to within the aforementioned range and by adjusting the sum total of average retention times to within the aforementioned range, it is possible to decrease sufficiently the retention time distribution of polypropylene particles in the propylene polymerization tanks P1, P2, P3. This makes it possible to make polypropylene particles discharged from the propylene polymerization tank P3 and introduced into the copolymerization tank PE1 sufficiently uniform in particle diameter.

If the average retention time of polypropylene particles in each propylene polymerization tank is shorter than 0.1 h, the propylene polymerization reaction does not advance sufficiently, and if the average retention time is longer than 1.5 h, the retention time distribution of polypropylene particles becomes broader, so that the obtained polypropylene particles become uneven in particle diameter. Further, if the sum total of average retention times of polypropylene particles in the propylene polymerization tanks P1, P2, P3 is shorter than 1.5 h, the propylene polymerization reaction does not advance sufficiently, and if the sum total is longer than 3.0 h, the propylene polymerization reaction advances in excess and an excess amount of homopropylene component is obtained.

From the standpoint of further reducing the number of fisheyes in the propylene-ethylene block copolymer and improving the operation efficiency, it is preferred that the average retention time of polypropylene particles in each propylene polymerization tank be 0.2 to 1.2 h, more preferably 0.3 to 1.0 h. Further, from the same standpoints, it is preferred that the sum total of the average retention times of polypropylene particles in the propylene polymerization tanks P1, P2, P3 be 1.5 to 2.5 h.

The sum total of the average retention times of particles in the copolymerization tanks PE1, PE2 is preferred to be as long as possible, and the value thereof may be appropriately set according, for example, to the intended application of the produced propylene-ethylene block copolymer. From the standpoint of obtaining a propylene-ethylene block copolymer with a sufficiently high structural uniformity, the sum total of the average retention times in the second polymerization process is preferably equal to or longer than 1.0 h, more preferably equal to or longer than 1.5 g, even more preferably equal to or longer than 2.0 h, and still more preferably equal to or longer than 3.0 h. From the standpoint of time required for a transition such as a grade change, the sum total of the average retention times is preferably within 5.0 h.

The sum total of the average retention times in the copolymerization tanks PE1, PE2 is preferably as long as possible because the polymerization activity of the solid catalyst decreases with time. When the sum total of the average retention times in the copolymerization tanks is short, (1) if polypropylene particles with a shorter retention time in the first polymerization process are subjected to the copolymerization in the second polymerization process, the propylene-ethylene block copolymer obtained comes to have a larger content of propylene-ethylene component, and (2) if polypropylene particles with a longer retention time in the first polymerization process are subjected to the copolymerization in the second polymerization process, the propylene-ethylene block copolymer obtained comes to have a lower content of propylene-ethylene component. The content distribution of propylene-ethylene component in each propylene-ethylene block copolymer particle obtained under the above conditions becomes broader and fisheyes easily occur in molded products. In order to resolve this problem, it is preferable to perform the propylene-ethylene block copolymerization while increasing the sum total of the average retention times in the second polymerization process as much as possible. If polypropylene particles with a shorter retention time in the first polymerization process are subjected to the production of a propylene-ethylene component in the copolymerization tanks, the amount of the propylene-ethylene component does not increase proportionally to the retention time even if the copolymerization is performed for a long time, due to the deterioration in polymerization performance of the solid catalyst with time. Conversely, polypropylene particles with a longer retention time in the first polymerization process have a reduced polymerization activity, and therefore, when such polypropylene particles are transferred to the second polymerization process, a higher amount of the propylene-ethylene component can be ensured by extending as much as possible the sum total of the average retention times in the second polymerization process. Therefore, a longer sum total of the average retention times in the copolymerization tanks is preferred.

In the present embodiment, it is preferred that the propylene-ethylene block copolymer be produced in a specified amount relative to the weight of the solid catalyst used. Specifically, the propylene homopolymerization and the copolymerization of propylene and ethylene are preferably performed so that the weight of the propylene-ethylene block copolymer after the second polymerization process will be 20,000 to 40,000 parts by weight (more preferably 20,000 to 30,000 parts by weight), where the amount of the solid catalyst supplied per unit time to the propylene homopolymerization and the copolymerization of propylene and ethylene is let be 1 part by weight.

If the weight of the propylene-ethylene block copolymer is equal to or more than 20,000 parts by weight per 1 part by weight of the solid catalyst, the catalyst cost is likely to decrease, and if it is equal to or less than 40,000 parts by weight, the structural uniformity of the propylene-ethylene block copolymer is likely to increase and the number of fisheyes tends to decrease. In the present embodiment, it is preferable to supply a silicon compound represented by Formula [1] to the polymerization tank(s) of the second polymerization process:

$$Si(OL)_4 \qquad [1]$$

wherein L is independently in each occurrence a monovalent hydrocarbon group having 1 to 20 carbon atoms. Such a silicon compound preferably is tetramethoxysilane or tetraethoxysilane.

As described hereinabove, the propylene-ethylene block copolymer produced in the present embodiment has high structural uniformity. Therefore, by using such a copolymer, it is possible to decrease sufficiently the number of fisheyes in a produced molded product.

Specific examples of the solid catalyst, the propylene polymerization tanks P1, P2, P3 and the copolymerization tanks PE1, PE2 used in the present embodiment will be described below.

Solid Catalyst

Well-known solid catalysts that are suitable for olefin polymerization can be used as an addition polymerization catalyst in the present embodiment. Examples of such catalysts include solid catalysts obtained by bringing a solid catalyst component containing titanium, magnesium, a halogen and an electron donor, an organoaluminum compound component, and an electron donor component into contact with each other. The solid catalyst component is referred to hereinbelow as a catalyst component (A).

A catalyst which is generally called a titanium-magnesium composite catalyst can be used as the catalyst component (A), and this component can be obtained by bringing the below-described titanium compound, magnesium compound, and electron donor into contact with each other.

Examples of titanium compounds that can be used for the preparation of the catalyst component (A) include titanium compounds represented by a formula $Ti(OR^1)_aX_{4-a}$ ($R^1$ is a monovalent hydrocarbon group having 1 to 20 carbon atoms, X is a halogen atom, and a is a number satisfying $0 \leq a \leq 40$. Specific examples include tetrahalogenated titanium compounds such as titanium tetrachloride; trihalogenated alkoxytitanium compounds such as ethoxytitanium trichloride and butoxytitanium trichloride; dihalogenated dialkoxytitanium compounds such as diethoxytitanium dichloride and dibutoxytitanium dichloride; monohalogenated trialkoxytitanium compounds such as triethoxytitanium chloride and tributoxytitanium chloride; and tetraalkoxytitanium compounds such as tetraethoxytitanium and tetrabutoxytitanium. Such titanium compounds may be used solely or in combinations.

Examples of magnesium compounds that can be used for the preparation of the catalyst component (A) include magnesium compounds having a magnesium-carbon bond or a magnesium-hydrogen bond and being capable of demonstrating a reduction activity, or magnesium compounds that have no reduction activity. Specific examples of magnesium compounds can demonstrate a reduction activity include dialkylmagnesium compounds such as dimethylmagnesium, diethylmagnesium, dibutylmagnesium, and butylethylmagnesium; alkylmagnesium halide compounds such as butylmagnesium chloride; alkylalkoxymagnesium compounds such as butylethoxymagnesium; and alkylmagnesium hydrides such as butylmagnesium hydride. Such magnesium compounds which can demonstrate a reducing activity may be used in the form of complexes with organoaluminum compounds. Specific examples of magnesium compounds which can demonstrate no reducing activity include dihalogenated magnesium compounds such as magnesium dichloride; alkoxymagnesium halide compounds such as methoxymagnesium chloride, ethoxymagnesium chloride, and butoxymagnesium chloride; dialkoxymagnesium compounds such as diethoxymagnesium and dibutoxymagnesium; and magnesium carboxylates such as magnesium laurate and magnesium stearate. Such magnesium compounds which can demonstrate no reducing activity may be synthesized, in advance or when the catalyst component (A) is prepared, by a known method from magnesium compounds which can demonstrate a reducing activity.

Examples of electron donors that can be used for the preparation of the catalyst component (A) include oxygen-containing electron donors such as alcohols, phenols, ketones, aldehydes, carboxylic acids, esters of organic acids or inorganic acids, ethers, acid amides, and acid anhydrides; nitrogen-containing electron donors such as ammonia compounds, amines, nitrites, and isocyanates; and organic acid halides. Among these electron donors, inorganic acid esters, organic acid esters, and ethers are preferred.

Preferred examples of inorganic acid esters include silicon compounds represented by a formula $R^2{}_nSi(OR^3)_{4-n}$, wherein $R^2$ represents a monovalent hydrocarbon group having 1 to 20 carbon atoms or a hydrogen atom; $R^3$ represents a monovalent hydrocarbon group having 1 to 20 carbon atoms; n is a number satisfying $0 \leq n < 4$. Specific examples include tetraalkoxysilanes such as tetramethoxysilane, tetraethoxysilane, and tetrabutoxysilane; alkyltrialkoxysilanes such as methyltrimethoxysilane, ethyltrimethoxysilane, butyltrimethoxysilane, isobutyltrimethoxysilane, tert-butyltrimethoxysilane, methyltriethoxysilane, ethyltriethoxysilane, butyltriethoxysilane, isobutyltriethoxysilane, and tert-butyltriethoxysilane; and dialkyldialkoxysilanes such as dimethyldimethoxysilane, diethyldimethoxysilane, dibutyldimethoxysilane, diisobutyldimethoxysilane, di-tert-butyldimethoxysilane, butylmethyldimethoxysilane, butylethyldimethoxysilane, tert-butylmethyldimethoxysilane, dimethyldiethoxysilane, diethyldiethoxysilane, dibutyldiethoxysilane, diisobutyldiethoxysilane, di-tert-butyldiethoxysilane, butylmethyldiethoxysilane, butylethyldiethoxysilane, and tert-butylmethyldiethoxysilane.

Preferred examples of organic acid esters include mono- or polycarboxylic acid esters, such as aliphatic carboxylic acid esters, alicyclic carboxylic acid esters, and aromatic carboxylic acid esters. Specific examples include methyl acetate, ethyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, diethyl phthalate, di-n-butyl phthalate, and diisobutyl phthalate. Preferred among them are unsaturated aliphatic carboxylic acid esters such as methacrylic acid esters and phthalic acid esters such as maleic acid esters, and even more preferred are phthalic acid diesters.

Examples of ethers include dialkyl ethers such as diethyl ether, dibutyl ether, diisobutyl ether, diamyl ether, diisoamyl ether, methyl butyl ether, methyl isoamyl ether, and ethyl isobutyl ether. Preferred among them are dibutyl ether and diisoamyl ether.

Examples of organic acid halides include mono- and polycarboxylic acid halides such as aliphatic carboxylic acid halides, alicyclic carboxylic acid halides, and aromatic carboxylic acid halides. Specific examples include acetyl chloride, propionic acid chloride, butyric acid chloride, valeric acid chloride, acrylic acid chloride, methacrylic acid chloride, benzoyl chloride, toluic acid chloride, anisic acid chloride, succinic acid chloride, malonic acid chloride, maleic acid chloride, itaconic acid chloride, and phthalic acid chloride. Preferred among them are aromatic carboxylic acid chlorides such as benzoyl chloride, toluic acid chloride, and phthalic acid chloride. Particularly preferred is phthalic acid chloride.

The following methods can be used for preparing the catalyst component (A).

(1) A method by which a liquid magnesium compound or a complex compound of a magnesium compound and an electron donor is caused to react with a precipitating agent and then treated with a titanium compound or with a titanium compound and an electron donor.

(2) A method by which a solid magnesium compound or a complex compound of a solid magnesium compound and an electron donor is treated with a titanium compound or a titanium compound and an electron donor.

(3) A method by which a liquid magnesium compound and a liquid titanium compound are caused to react in the presence of an electron donor, so that the obtained solid titanium composite is precipitated.

(4) A method by which the reaction product obtained by method (1), (2), or (3) is further treated with a titanium compound or an electron donor and a titanium compound.

(5) A method by which an alkoxytitanium compound is reduced by an organic magnesium compound such as a Grignard reagent in the presence of a silicon compound having an Si—O bond, and the obtained solid product is treated with an ester compound, an ether compound, and titanium tetrachloride.

(6) A method by which a titanium compound is reduced with an organomagnesium compound in the presence of a silicon compound or a silicon compound and an ester compound, the obtained solid product is treated by successively adding a mixture of an ether compound and titanium tetrachloride and then an organic acid halide compound, and then the treated solid product is treated with a mixture of an ether compound and titanium tetrachloride or a mixture of an ether compound, titanium tetrachloride and an ester compound.

(7) A method by which a reaction product of a metal oxide, dihydrocarbylmagnesium and a halogen-containing alcohol is brought into contact with an electron donor and a titanium compound after or before treatment with a halogenating agent.

(8) A method by which a magnesium salt of an organic acid and a magnesium compound such as an alkoxymagnesium are brought into contact with an electron donor and a titanium compound after or before treatment with a halogenating agent.

(9) A method by which the compound obtained by any of the method (1) to (8) is treated with a halogen, a halogen compound, or an aromatic hydrocarbon.

Among these methods for preparing the catalyst component (A), methods (1) to (6) are preferred. These preparation methods are usually performed under an inert gas atmosphere such as nitrogen and argon.

In the preparation of the catalyst component (A), the titanium compound, silicon compound, and ester compound are preferably used after being dissolved or diluted with an appropriate solvent. Examples of suitable solvents include aliphatic hydrocarbons such as hexane, heptane, octane, and decane; aromatic hydrocarbons such as toluene and xylene; alicyclic hydrocarbons such as cyclohexane, methyl cyclohexane, and decalin; and ether compounds such as diethyl ether, dibutyl ether, diisoamyl ether, and tetrahydrofuran.

In the preparation of the catalyst component (A), the temperature of the reduction using an organomagnesium compound is usually −50° C. to 70° C. From the standpoint of increasing the catalytic activity and saving the cost, the temperature preferably is −30° C. to 50° C. and more preferably is −25° C. to 35° C. While the time period during which the organomagnesium compound is added dropwise not particularly limited, it is usually about 30 min to about 12 h. Upon completion of the reduction, a post-reaction may be further performed at a temperature of 20° C. to 120° C.

In the preparation of the catalyst component (A), a porous substance such as inorganic oxides and organic polymers may be used during the reduction and the porous substance may be impregnated with a solid reduction product. The porous substance preferably has a pore volume of equal to or higher than 0.3 mL/g at a pore radius of 20 to 200 nm and an average particle diameter of 5 to 300 μm. Examples of suitable porous inorganic oxides include $SiO_2$, $Al_2O_3$, MgO, $TiO_2$, $ZrO_2$ and complex oxides thereof. Examples of porous polymers include polystyrene-based porous polymers such as polystyrene and styrene-divinyl benzene copolymer; poly(acrylic ester)-based porous polymers such as poly(ethyl acrylate), methyl acrylate-divinyl benzene copolymer, poly(methyl methacrylate), and methyl methacrylate-divinyl benzene copolymer; and polyolefin-based porous polymers such as polyethylene, ethylene-methyl acrylate copolymer, and polypropylene. Among such porous substances, preferred are $SiO_2$, $Al_2O_3$, and styrene-divinyl benzene copolymer.

The catalyst component (A) may be converted into the form of a prepolymerized catalyst containing a solid catalyst obtained by polymerizing a small amount of an olefin prior to supplying to the polymerization. The prepolymerized catalyst may be referred to hereinbelow as "prepolymerized catalyst component", and the polymerization of a small amount of olefine may be hereinbelow as "prepolymerization." The amount of the olefin subjected to the prepolymerization is usually 0.1 to 200 g per gram of the catalyst component (A). A known method can be used for the prepolymerization. For example, the prepolymerization can be implemented in a slurry state by supplying a small amount of propylene and using a solvent in the presence of the catalyst component (A) and an organoaluminum compound. Examples of solvents suitable for the prepolymerization include inert saturated hydrocarbons such as propane, butane, isobutane, pentane, isopentane, hexane, heptane, octane and cyclohexane, inert aromatic hydrocarbons such as benzene and toluene, and liquid propylene. Mixtures of two or more such solvents may be used. The concentration of slurry in the prepolymerization is usually 1 to 500 g, preferably 3 to 150 g, in terms of the weight of the catalyst component (A) contained in 1 L of the solvent.

The amount of the organoaluminum compound used in the prepolymerization is 0.1 to 700 mol, preferably 0.2 to 200 mol, more preferably 0.2 to 100 mol per mole of titanium atoms contained in the catalyst component (A). The prepolymerization may be performed in the presence of an electron donor, if necessary. The amount of the electron donor used in the prepolymerization is preferably 0.01 to 400 mol, more preferably 0.02 to 200 mol, even more preferably 0.03 to 100 mol per mole of titanium atoms contained in the catalyst component (A). A chain transfer agent such as hydrogen may also be used in the prepolymerization.

The prepolymerization temperature is usually −20° C. to 100° C., preferably 0 to 80° C. The prepolymerization time is usually 2 min to 15 h.

The organoaluminum compound component used in the preparation of the solid catalyst has at least one Al-carbon bond in a molecule, and typical compounds can be represented by the following formulae:

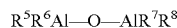

wherein $R^4$ is independently in each occurrence a monovalent hydrocarbon group having 1 to 8 carbon atoms; Y is independently in each occurrence a halogen atom, hydrogen, or an alkoxy group; and $R^5$ $R^6$, $R^7$ and $R^8$ are each independently a monovalent hydrocarbon group having 1 to 8 carbon atoms. Further, m is a number satisfying $2 \leq m \leq 3$.

Specific examples of the organoaluminum compound component include trialkylaluminum such as triethylaluminum and triisobutylaluminum; dialkylaluminum hydride such as diethylaluminum hydride and diisobutylaluminum hydride; dialkylaluminum halides such as diethylaluminum chloride and diisobutylaluminum chloride; mixtures of trialkylaluminum and dialkylaluminum halide such as a mixture of triethylaluminum and diethylaluminum chloride; and alkylalumoxanes such as tetraethyldialumoxane and tetrabutyldialumoxane. Among such organoaluminum compounds, trialkylaluminum, a mixture of trialkylaluminum and dialkylaluminum halide, and alkylalumoxanes are preferred, and triethylaluminum, triisobutylaluminum, a mixture of triethylaluminum and diethylaluminum chloride, and tetraethyldialumoxane are more preferred.

Examples of electron donors that can be used for the preparation of the solid catalyst include oxygen-containing electron donors such as alcohols, phenols, ketones, aldehydes, carboxylic acids, esters of organic acids or inorganic acids, ethers, acid amides, and acid anhydrides; nitrogen-containing electron donors such as ammonia compounds, amines, nitrites, and isocyanates; and organic acid halides. Among such electron donors, inorganic acid esters, organic acid esters, and ethers are preferred.

Preferred examples of inorganic acid esters include silicon compounds represented by a formula $R^9_n Si(OR^{10})_{4-n}$ wherein $R^9$ represents independently in each occurrence a monovalent hydrocarbon group having 1 to 20 carbon atoms or a hydrogen atom; $R^{10}$ is independently in each occurrence a monovalent hydrocarbon group having 1 to 20 carbon atoms; n is a number satisfying $0 \leq n < 4$. Specific examples include tetrabutoxysilane, butyltrimethoxysilane, tert-butyl-n-propyldimethoxysilane, dicyclopentyldimethoxysilane, and cyclohexylethyldimethoxysilane.

Preferred ethers are dialkyl ethers and diether compounds represented by the general formula:

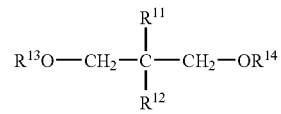

wherein $R^{11}$ to $R^{14}$ are each independently a linear or branched alkyl group having 1 to 20 carbon atoms, an alicyclic hydrocarbon group, an aryl group, or an aralkyl group;

$R^{11}$ or $R^{12}$ may be a hydrogen atom. Specific examples include dibutyl ether, diamyl ether, 2,2-diisobutyl-1,3-dimethoxypropane, and 2,2-dicyclopentyl-1,3-dimethoxypropane.

Among such electron donor components, organosilicon compounds represented by a formula $R^{15}R^{16}Si(OR^{17})$ are particularly preferred. In the formula, $R^{15}$ represents a monovalent hydrocarbon group having 3 to 20 carbon atoms that has a secondary or tertiary carbon atom adjacent to the Si atom, more specifically, a branched alkyl group such as an isopropyl group, a sec-butyl group, a tert-butyl group, and a tert-amyl group; a cycloalkyl group such as a cyclopentyl group and a cyclohexyl group; a cycloalkenyl group such as a cyclopentenyl group; and an aryl group such as a phenyl group and a tolyl group. $R^{16}$ is a monovalent hydrocarbon group having 1 to 20 carbon atoms, more specifically, a linear alkyl group such as a methyl group, an ethyl group, a propyl group, a butyl group, and a pentyl group; a branched alkyl group such as an isopropyl group, a sec-butyl group, a tert-butyl group, and a tert amyl group; a cycloalkyl group such as a cyclopentyl group and a cyclohexyl group; a cycloalkenyl group such as a cyclopentenyl group; and an aryl group such as a phenyl group and a tolyl group. $R^{17}$ is a monovalent hydrocarbon group having 1 to 20 carbon atoms, preferably a hydrocarbon group having 1 to 5 carbon atoms. Specific examples of organosilicon compounds that can be used as such an electron donor component include tert-butyl-n-propyldimethoxysilane, dicyclopentyldimethoxysilane, and cyclohexylethyldimethoxysilane.

The amount of the organoaluminum compound component that is used in the preparation of the solid catalyst is usually 1 to 1000 mol, preferably 5 to 800 mol per mole of titanium atoms contained in the catalyst component (A). The amount of the electron donor component is usually 0.1 to 2000 mol, preferably 0.3 to 1000 mol, more preferably 0.5 to 800 mol per mole of titanium atoms contained in the catalyst component (A).

Propylene Polymerization Tanks

In the propylene polymerization tanks P1, P2, P3, propylene is homopolymerized in the presence of a solid catalyst, and polypropylene particles are formed. Examples of suitable propylene polymerization tanks P1, P2, P3 include liquid-phase polymerization reactors such as a slurry polymerization reactor and a bulk polymerization reactor or a gas-phase polymerization reactor such as an agitated gas-phase polymerization reactor and a fluidized bed gas-phase polymerization reactor.

A known polymerization reactor such as agitated reactors and loop reactors described in Japanese Examined Patent Application Publication Nos. 41-12916, 46-11670, and 47-42379 can be used as the slurry polymerization reactor. A known polymerization reactor such as agitated reactors and loop reactors described in Japanese Examined Patent Application Publication Nos. 41-12916, 46-11670, and 47-42379 can be used as the bulk polymerization reactor.

A known polymerization reactor, for example, reactors described in Japanese Unexamined Patent Application Publication No. 46-31969 and Japanese Examined Patent Application Publication No. 59-21321 can be used as the agitated gas-phase polymerization reactor. A known polymerization reactor, for example, reactors described in Japanese Unexamined Patent Application Publication Nos. 58-201802, 59-126406, and 2-233708 can be used as the fluidized gas-phase polymerization reactor.

The three propylene polymerization tanks P1, P2, P3 may be reactors of identical specifications or reactors of different specifications. However, from the standpoint of preventing the occurrence of hot spots inside the tanks and improving the uniformity of reaction temperature, it is preferred that liquid-phase polymerization reactors be employed at least as the propylene polymerization tanks P1, P2. When an upstream-located liquid-phase polymerization reactor is used in combination with a downstream-located gas-phase polymerization reactor, a flushing tank may be provided between the two reactors in order to separate unreacted propylene and the polymerization solvent from polypropylene particles.

Copolymerization Tank

Polypropylene particles produced in the propylene polymerization tanks P1, P2, P3 are introduced into the copolymerization tanks PE1, PE2 and copolymerization reaction of propylene and ethylene is performed there substantially in a gaseous state, so that a propylene-ethylene block copolymer is formed. A gas phase polymerization reactor such as an agitated gas-phase polymerization reactor and a fluidized bed gas-phase polymerization reactor can be employed as the copolymerization tank PE1, PE2. The two copolymerization tanks PE1, PE2 may be reactors having identical specifications or reactors having different specifications. Reactors which can be employed as the propylene polymerization tanks P1, P2, P3 can be also used as agitated gas-phase polymerization reactors and fluidized bed gas-phase polymerization reactors as the copolymerization tanks.

It is preferred that a specified amount of a catalyst deactivator be added in the copolymerization in the copolymerization tanks PE1, PE2. For example, if polypropylene particles that have not yet sufficiently grown are supplied to the copolymerization tanks PE1, PE2, the copolymerization reaction advances in excess due to a high activity of the catalyst contained in the polypropylene particles, and there is a risk of producing a propylene-ethylene block copolymer with an excess amount of propylene-ethylene component. By inhibiting the catalytic activity by the action of the catalyst deactivator, it is possible to prevent the excess advance of copolymerization reaction and improve structural uniformity of the obtained propylene-ethylene block copolymer.

Examples of the catalyst deactivator include compounds that have been generally used for this purpose, such as oxygen-containing electron donors such as oxygen, alcohols, phenols, ketones, aldehydes, carboxylic acids, esters of organic or inorganic acids, ethers, acid amide, and acid anhydrides, and nitrogen-containing electron donors such as ammonia compounds including ammonia and ammonium salts, amines, nitrites, and isocyanates. Among such electron donors, inorganic acid esters and ethers are preferred.

Preferred examples of inorganic acid esters include silicon compounds represented by a formula $R^{19}{}_{n}Si(OR^{20})_{4-n}$, wherein $R^{19}$ represents independently in each occurrence a monovalent hydrocarbon group having 1 to 20 carbon atoms or a hydrogen atom; $R^{20}$ is independently in each occurrence a monovalent hydrocarbon group having 1 to 20 carbon atoms; n is a number satisfying $0 \leq n < 4$. A silicon compound with n=0 is preferred. Specific examples include tetramethoxysilane, tetraethoxysilane, tetrabutoxysilane, butyltrimethoxysilane, tert-butyl-n-propyldimethoxysilane, dicyclopentyldimethoxysilane, and cyclohexylethyldimethoxysilane.

Preferred ethers are dialkyl ethers and diether compounds represented by a formula:

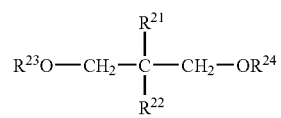

wherein the formula $R^{21}$ to $R^{24}$ are each independently a linear or branched alkyl group having 1 to 20 carbon atoms, an alicyclic hydrocarbon group, an aryl group, or an aralkyl group; $R^{21}$ or $R^{22}$ may be a hydrogen atom. Specific examples include dibutyl ether, diamyl ether, 2,2-diisobutyl-1,3-dimethoxypropane and 2,2-dicyclopentyl-1,3-dimethoxypropane.

While the amount of the catalyst deactivator added may be appropriately adjusted according to the type of the solid catalyst and the remaining activity of the catalyst, it is preferred, from the standpoint of carrying out the copolymerization reaction to an appropriate degree, that the catalyst deactivator be added in an amount of 0.005 to 500 mol, more preferably 0.01 to 300 mol per mole of titanium (Ti) contained in the solid catalyst.

Copolymerization of propylene and ethylene is not limited to gas-phase polymerization and can be also carried out by liquid-phase polymerization. However, from the standpoint of structural uniformity of the propylene-ethylene block copolymer obtained, elution of the propylene-ethylene component to the liquid-phase and the amount of purified recyclable feedstock, it is preferred that the copolymerization be performed by gas-phase polymerization rather than by liquid-phase polymerization.

EXAMPLES

The present invention will be explained hereinbelow based on examples and comparative examples. Physical properties were measured and evaluated by the following methods.

(1) Intrinsic Viscosity (Unit: dl/g)

A reduced viscosity was measured with respect to three concentrations: 0.1, 0.2, and 0.5 g/dl under conditions of a tetralin solvent and a temperature of 135° C. by using an Ubbelohde viscometer. An intrinsic viscosity was then determined by an extrapolation method by which the reduced viscosity was plotted against concentration and the concentration was extrapolated to zero in accordance with the calculation method described in "Kobunshi Yoeki, Kobunshi Jikkengaku 11 (Polymer Solution, Experiment on Polymer 11)" (published in 1982 by Kyoritsu Shuppan Co., Ltd.), pp. 491.

(2) Heat of Fusion (Unit: J/g)

Measurements were carried out under the following conditions by using a differential scanning colorimeter (Perkins Elmer Co., DSC-7).

(i) A sample, about 10 mg, was heated from 50° C. to 220° C. at a temperature rise rate of 200° C./min and held for 5 min upon completion of heating.

(ii) The temperature was then lowered from 220° C. to 180° C. at a temperature lowering rate or 70° C./min, and the sample was held for 5 min after the temperature has been lowered.

(iii) The temperature was then lowered from 180° C. to 50° C. at a temperature lowering rate or 200° C./min, and the sample was held for 1 min after the temperature has been lowered.

(iv) The temperature was then raised from 50° C. to 180° C. at a temperature rise rate of 16° C./min.

The curve obtained in (iv) was a fusion curve, and the heat of fusion was determined using a straight line connecting a point of 95° C. on the fusion curve to a point (about 175° C.) at which the fusion curve returned to a base line on the high-temperature side.

(3) Content of Propylene Units (Unit: wt. %).

The content of propylene units was determined by an IR absorption spectrum method.

(4) Number of Fisheyes (Unit: Unit/100 $cm^2$).

A polymer obtained was shaped into a film with a thickness of 80 μm at a temperature of 220° C. by using a cast film production device (manufactured by Tanabe Plastic Co., extruder with a diameter of 20 mm, T-die with a width of 100 mm). An image of the film was captured to a computer by using a scanner (manufactured by Seiko Epson Corp.) and then the image was analyzed with an image analysis program (produced by Asahi Engineering Co.) and the numbers of fisheyes with a diameter equal to or larger than 100 μm and those with a diameter equal to or larger than 200 μm were counted. The number of fisheyes was expressed as an amount per 100 $cm^2$ of the film.

Example 1

Preparation of Solid Catalyst

The atmosphere inside a SUS reaction vessel equipped with a stirrer and having a capacity of 200 L was replaced with nitrogen. 80 L of hexane, 6.55 mol of tetrabutoxytitanium, 2.8 mol of diisobutyl phthalate, and 98.9 mol of tetraethoxysilane were loaded into the vessel and stirred to obtain a solution. To this solution was added 51 L of a diisobutyl ether solution of butylmagnesium chloride at a concentration of 2.1 mol/L dropwise slowly over 5 h, while maintaining the temperature inside the reaction vessel at 5° C. Upon completion of the dropwise addition, stirring was carried out for 1 h at room temperature, solid-liquid separation was performed at room temperature, and the solid product was washed three times with 70 L of toluene. Toluene was then added till the slurry concentration became 0.2 kg/L, and then 47.6 mol of diisobutyl phthalate was added and a reaction was carried out for 30 min at 95° C.

Solid-liquid separation was performed after the reaction, and the solid product was washed twice with toluene. Then, 3.13 mol of diisobutyl phthalate, 8.9 mol of dibutyl ether, and 274 mol of titanium tetrachloride were added and a reaction was carried out for 3 h at 105° C. Upon completion of the reaction, solid-liquid separation was performed at that temperature, and the solid product was washed twice with 90 L of toluene at that temperature. The slurry concentration was then adjusted to 0.4 kg/L, 8.9 mol of dibutyl ether and 137 mol of titanium tetrachloride were added, and a reaction was carried out for 1 h at 105° C. Upon completion of the reaction, solid-liquid separation was performed at that temperature, the solid product was washed six times with 90 L of toluene at that temperature, then washing was performed three times with 70 L of hexane, and the product was vacuum dried to produce 11.4 kg of a solid catalyst component.

(Prepolymerization)

1.5 L of n-hexane degassed and dehydrated sufficiently, 30 mmol of triethylaluminum, and 3.0 mmol of cyclohexylethyldimethoxysilane were placed in a SUS autoclave equipped with a stirrer and having a capacity of 3 L. 16 g of the solid catalyst component was added thereto, and then, while maintaining the temperature inside the autoclave at about 3 to about 10° C., 32 g of propylene was continuously supplied over about 40 min to conduct prepolymerization. The prepolymerized slurry was then transferred to a SUS autoclave equipped with a stirrer and having an inner capacity of 200 L, and then 133 L of liquid butane was added to form a slurry of a prepolymerized catalyst component.

By using the slurry of prepolymerized catalyst component obtained in the above-described manner, three-stage propylene homopolymerization was performed stage by stage in different reactors to produce polypropylene particles. One-stage copolymerization of propylene and ethylene was then performed in the presence of the polypropylene particles to produce a propylene-ethylene block copolymer. Each polymerization process will be described below in detail.

First Propylene Polymerization (Liquid-Phase Polymerization)

Homopolymerization of propylene was carried out using a vessel-type reactor equipped with a stirrer and having a capacity of 40 L. Specifically, propylene, hydrogen, triethylaluminum, cyclohexylethyldimethoxysilane, and the slurry of the prepolymerized catalyst component were continuously supplied to the reactor. The reaction conditions were as follows: polymerization temperature: 78° C., stirring rate: 150 rpm, liquid level in the reactor: 18 L, supply rate of propylene: 22 kg/h, supply rate of hydrogen: 190 NL/h, supply rate of triethylaluminum: 39.7 mmol/h, supply rate of cyclohexylethyldimethoxysilane: 5.8 mmol/h, supply rate of slurry of prepolymerized catalyst component (calculated as solid catalyst component): 0.704 g/h, and reactor operation time: 12 h. The average retention time of the slurry in the reactor was 0.30 h. The polypropylene particles were discharged at 3.75 kg/h. The intrinsic viscosity of the particles was 0.87 dl/g.

Second Propylene Polymerization (Liquid-Phase Polymerization)

The slurry obtained by the first propylene polymerization was continuously transferred to another vessel type reactor. Propylene and hydrogen were continuously supplied to this reactor to further perform homopolymerization of the propylene. The reaction conditions were as follows: polymerization temperature: 75° C., stirring rate: 150 rpm, liquid level in the reactor: 44 L, supply rate of propylene: 6 kg/h, supply rate of hydrogen: 30 NL/h, and reactor operation time: 12 h. The average retention time of the slurry in the reactor was 0.69 h. The polypropylene particles were discharged at 9.9 kg/h. The intrinsic viscosity of the particles was 0.87 dl/g.

Third Propylene Polymerization (Liquid-Phase Polymerization)

The slurry obtained by the second propylene polymerization was continuously transferred to yet another vessel type reactor, and homopolymerization of propylene was further performed. No hydrogen was supplied to the reactor. The reaction conditions were as follows: polymerization temperature: 68° C., stirring rate: 150 rpm, liquid level in the reactor: 44 L, supply rate of propylene: 3 kg/h, and reactor operation time: 12 h. The average retention time of the slurry in the reactor was 0.71 h. The polypropylene particles were discharged at 14.9 kg/h. The particles had an intrinsic viscosity of 0.87 dl/g, and a heat of fusion of 110.4 J/g.

First Copolymerization (Gas-Phase Polymerization)

Polypropylene particles obtained from the third propylene polymerization were continuously transferred to a fluidized-bed reactor equipped with a stirrer and having a capacity of 1 m³. Propylene, ethylene, and hydrogen were continuously supplied to the reactor, and copolymerization of propylene and ethylene was performed. The reaction conditions were as follows: polymerization time: 70° C., polymerization pressure: 1.8 MPa, blow rate of circulation gas: 140 m³/h, concentration ratio (vol. %) of gases inside the reactor: propylene/ethylene/hydrogen=68.4/24.5/1.45, amount of polymer particles held in the fluidized bed: 55 kg, and reactor operation time: 12 h. Oxygen (deactivator) was added to the supplied gases in an amount corresponding to 0.087 mol per mole of triethylaluminum supplied to the reactor. The average retention time of polymer particles (propylene-ethylene block copolymer) in the reactor was 2.42 h. The polymer particles were discharged at 19.0 kg/h. The particle had an intrinsic viscosity of 1.45 dl/g, and a heat of fusion of 86.4 J/g. The content of propylene units was 92.0 wt. %. The bulk density of the polymer particles was 0.420 g/cm³.

Example 2

A propylene-ethylene block copolymer was produced by the same method as in Example 1, except that the amount of supplied oxygen (deactivator) was changed to an amount equivalent to 0.083 mol per mole of triethylaluminum supplied to the first copolymerization reactor. The average retention time of polymer particles (propylene-ethylene block copolymer) in the reactor was 2.82 h. The polymer particles were discharged at 19.7 kg/h. The particles had an intrinsic viscosity of 1.50 dl/g and a heat of fusion of 84.2 J/g. The content of propylene units was 91.3 wt. %. The bulk density of the polymer particles was 0.423 g/cm³.

Example 3

A propylene-ethylene block copolymer was produced by the same method as in Example 1, except that tetraethoxysilane was added to the first-stage copolymerization reactor (gas-phase polymerization reactor) in an amount equivalent to 1.0 mol per mole of triethylaluminum supplied to that reactor, that the concentration ratio (vol. %) of gases inside the reactor of the first copolymerization to propylene/ethylene/hydrogen=68.3/23.2/1.46, and that the amount of supplied oxygen (deactivator) was changed to an amount equivalent to 0.0045 mol per mole of triethylaluminum supplied to the reactor. The average retention time of polymer particles (propylene-ethylene block copolymer) in the reactor was 2.93 h. The polymer particles were discharged at 18.8 kg/h. The particles had an intrinsic viscosity of 1.54 dl/g and a heat of fusion of 83.0 J/g. The content of propylene units was 90.5 wt. %. The bulk density of the polymer particles was 0.427 g/cm³.

Example 4

A solid catalyst component and a slurry of a prepolymerized catalyst component were prepared by the same method as in Example 1. By using the slurry, three-stage propylene homopolymerization was performed stage by stage in different reactors to produce polypropylene particles. One-stage copolymerization of propylene and ethylene was then performed in the presence of the polypropylene particles to produce a propylene-ethylene block copolymer. Each polymerization process will be described below in detail.

First Propylene Polymerization (Liquid-Phase Polymerization)

Homopolymerization of propylene was carried out using a vessel type reactor equipped with a stirrer and having a capacity of 40 L. Specifically, propylene, hydrogen, triethylaluminum, cyclohexylethyldimethoxysilane, and the slurry of the prepolymerized catalyst component were continuously supplied to the reactor. The reaction conditions were as follows: polymerization temperature: 78° C., stirring rate: 150 rpm, liquid level in the reactor: 18 L, supply rate of propylene: 22 kg/h, supply rate of hydrogen: 190 NL/h, supply rate of triethylaluminum: 39.4 mmol/h, supply rate of cyclohexylethyldimethoxysilane: 6.0 mmol/h, supply rate of slurry of prepolymerized catalyst component (calculated as solid catalyst component): 0.573 g/h, and reactor operation time: 12 h. The average retention time of the slurry in the reactor was 0.30 h. The polypropylene particles were discharged at 3.10 kg/h. The intrinsic viscosity of the particles was 0.87 dl/g.

Second Propylene Polymerization (Liquid-Phase Polymerization)

The slurry obtained by the first-stage propylene polymerization was continuously transferred to another vessel type reactor, propylene and hydrogen were continuously supplied to this reactor to further perform homopolymerization of the propylene. The reaction conditions were as follows: polymerization temperature: 75° C., stirring rate: 150 rpm, liquid level in the reactor: 44 L, supply rate of propylene: 6 kg/h, supply rate of hydrogen: 25 NL/h, and reactor operation time: 12 h. The average retention time of the slurry in the reactor was 0.67 h. The polypropylene particles were discharged at 8.2 kg/h. The intrinsic viscosity of the particles was 0.87 dl/g.

Third Propylene Polymerization (Liquid-Phase Polymerization)

The slurry obtained by the second propylene polymerization was continuously transferred to yet another vessel type reactor, and homopolymerization of propylene was further performed. No hydrogen was supplied to the reactor. The reaction conditions were as follows: polymerization temperature: 68° C., stirring rate: 150 rpm, liquid level in the reactor: 80 L, supply rate of propylene: 3 kg/h, and reactor operation time: 12 h. The average retention time of the slurry in the reactor was 1.31 h. The polypropylene particles were discharged at 14.5 kg/h. The particles had an intrinsic viscosity of 0.87 dl/g, and a heat of fusion of 109.5 J/g.

First Copolymerization (Gas-Phase Polymerization)

Polypropylene particles obtained from the third propylene polymerization were continuously transferred to a fluidized-bed reactor equipped with a stirrer and having a capacity of 1 m$^3$. Propylene, ethylene, and hydrogen were continuously supplied to the reactor, and copolymerization of propylene and ethylene was performed. The reaction conditions were as follows: polymerization time: 70° C., polymerization pressure: 1.8 MPa, blow rate of circulation gas: 140 m$^3$/h, concentration ratio (vol. %) of gases inside the reactor: propylene/ethylene/hydrogen=68.1/26.4/1.48, amount of polymer particles held in the fluidized bed: 55 kg, and reactor operation time: 16 h. Oxygen (deactivator) was added to the supplied gases in an amount corresponding to 0.045 mol per mole of triethylaluminum supplied to the reactor. The average retention time of polymer particles (propylene-ethylene block copolymer) in the reactor was 2.93 h. The polymer particles were discharged at 18.8 kg/h. The particles had an intrinsic viscosity of 1.47 dl/g, and a heat of fusion of 84.4 J/g. The content of propylene units was 90.9 wt. %. The bulk density of the polymer particles was 0.422 g/cm$^3$.

Comparative Example 1

A solid catalyst component and a slurry of a prepolymerized catalyst component were prepared by the same method as in Example 1. By using the slurry, three-stage propylene homopolymerization was performed stage by stage in different reactors to produce polypropylene particles. One-stage copolymerization of propylene and ethylene was then performed in the presence of the polypropylene particles to produce a propylene-ethylene block copolymer. Each polymerization process will be described below in detail.

First Propylene Polymerization (Liquid-Phase Polymerization)

Homopolymerization of propylene was carried out using a vessel type reactor equipped with a stirrer and having a capacity of 40 L. Specifically, propylene, hydrogen, triethylaluminum, cyclohexylethyldimethoxysilane, and the slurry of the prepolymerized catalyst component were continuously supplied to the reactor. The reaction conditions were as follows: polymerization temperature: 78° C., stirring rate: 150 rpm, liquid level in the reactor: 18 L, supply rate of propylene: 21 kg/h, supply rate of hydrogen: 140 NL/h, supply rate of triethylaluminum: 41.0 mmol/h, supply rate of cyclohexylethyldimethoxysilane: 6.0 mmol/h, supply rate of slurry of prepolymerized catalyst component (calculated as solid catalyst component): 0.416 g/h, and reactor operation time: 12 h. The average retention time of the slurry in the reactor was 0.31 h. The polypropylene particles were discharged at 2.69 kg/h. The intrinsic viscosity of the particles was 0.86 dl/g.

Second Propylene Polymerization (Liquid-Phase Polymerization)

The slurry obtained by the first propylene polymerization was continuously transferred to another vessel type reactor. Propylene was continuously supplied to this reactor to her perform homopolymerization of the propylene. No hydrogen was supplied to the reactor. The reaction conditions were as follows: polymerization temperature: 75° C., stirring rate: 150 rpm, liquid level in the reactor: 85 L, supply rate of propylene: 1.0 kg/h, and reactor operation time: 12 h. The average retention time of the slurry in the reactor was 1.84 h. The polypropylene particles were discharged at 10.7 kg/h. The intrinsic viscosity of the particles was 0.86 dl/g.

Third Propylene Polymerization (Liquid-Phase Polymerization)

The slurry obtained by the second propylene polymerization was continuously transferred to yet another vessel type reactor, and homopolymerization of propylene was further performed. The reaction conditions were as follows: polymerization temperature: 68° C., stirring rate: 150 rpm, liquid level in the reactor: 44 L, supply rate of propylene: 10 kg/h, supply rate of hydrogen 20 NL/h, and reactor operation time: 12 h. The average retention time of the slurry in the reactor was 0.68 h. The polypropylene particles were discharged at 12.9 kg/h. The particles had an intrinsic viscosity of 0.86 dl/g, and a heat of fusion of 109.4 J/g.

First Copolymerization (Gas-Phase Polymerization)

Polypropylene particles obtained from the third propylene polymerization were continuously transferred to a fluidized-bed reactor equipped with a stirrer and having a capacity of 1 m$^3$. Propylene, ethylene, and hydrogen were continuously supplied to the reactor, and copolymerization of propylene and ethylene was performed. The reaction conditions were as follows: polymerization time: 70° C., polymerization pressure: 1.8 MPa, blow rate of circulation gas: 140 m$^3$/h, concentration ratio (vol. %) of gases inside the reactor: propylene/ethylene/hydrogen=66.8/28.7/1.55, amount of polymer particles held in the fluidized bed: 45 kg, and reactor operation time: 18 h. Oxygen (deactivator) was added to the supplied gases in an amount corresponding to 0.039 mol per mole of triethylaluminum supplied to the reactor. The average retention time of polymer particles propylene-ethylene block copolymer) in the reactor was 2.63 h. The polymer particles were discharged at 17.1 kg/h. The particles had an intrinsic viscosity of 1.53 dl/g, and a heat of fission of 82.7 J/g. The content of propylene units was 90.4 wt. %. The bulk density of the polymer particles was 0.432 g/cm$^3$.

Comparative Example 2

A solid catalyst component and a slurry of a prepolymerized catalyst component were prepared by the same method as in Example 1. By using the slurry, three-stage propylene homopolymerization was performed stage by stage in different reactors to produce polypropylene particles. One-stage copolymerization of propylene and ethylene was then performed in the presence of the polypropylene particles to produce a propylene-ethylene block copolymer. Each polymerization process will be described below in detail.

First Propylene Polymerization (Liquid-Phase Polymerization)

Homopolymerization of propylene was carried out using a vessel type reactor equipped with a stirrer and having a capacity of 40 L. Specifically, propylene, hydrogen, triethylaluminum, cyclohexylethyldimethoxysilane, and the slurry of the prepolymerized catalyst component were continuously supplied to the reactor. The reaction conditions were as follows: polymerization temperature: 78° C., stirring rate: 150 rpm, liquid level in the reactor: 18 L, supply rate of propylene: 21 kg/h, supply rate of hydrogen: 145 NL/h, supply rate of triethylaluminum: 40.6 mmol/, supply rate of cyclohexylethyldimethoxysilane: 6.0 mmol/h, supply rate of slurry of prepolymerized catalyst component (calculated as solid catalyst component): 0.396 g/h, and reactor operation time: 12 h. The average retention time of the slurry in the reactor was 0.32 h. The polypropylene particles were discharged at 2.43 kg/h. The intrinsic viscosity of the particles was 0.87 dl/g.

Second Propylene Polymerization (Liquid-Phase Polymerization)

The slurry obtained by the first-stage propylene polymerization was continuously transferred to another vessel type reactor. Propylene was continuously supplied to this reactor to further perform homopolymerization of the propylene. No hydrogen was supplied to the reactor. The reaction conditions were as follows: polymerization temperature: 75° C., stirring rate: 150 rpm, liquid level in the reactor: 85 L, supply rate of propylene: 1.0 kg/h, and reactor operation time: 12 h. The average retention time of the slurry in the reactor was 1.82 h. The polypropylene particles were discharged at 10.0 kg/h. The intrinsic viscosity of the particles was 0.87 dl/g.

Third Propylene Polymerization (Liquid-Phase Polymerization)

The slurry obtained by the second propylene polymerization was continuously transferred to yet another vessel type reactor, and homopolymerization of propylene was further performed. The reaction conditions were as follows: polymerization temperature: 68° C., stirring rate: 150 rpm, liquid level in the reactor: 85 L, supply rate of propylene: 3.0 kg/h, and reactor operation time: 12 h. The average retention time of the slurry in the reactor was 1.79 h. The polypropylene particles were discharged at 13.1 kg/h. The particles had an intrinsic viscosity of 0.87 dl/g, and a heat of fusion of 110.1 J/g.

First Copolymerization (Gas-Phase Polymerization)

Polypropylene particles obtained from the third propylene polymerization were continuously transferred to a fluidized-bed reactor equipped with a stirrer and having a capacity of 1 m$^3$. Propylene, ethylene, and hydrogen were continuously supplied to the reactor, and copolymerization of propylene and ethylene was performed. The reaction conditions were as follows: polymerization time: 70° C., polymerization pressure: 1.8 MPa, blow rate of circulation gas: 140 m$^3$/h, concentration ratio (vol. %) of gases inside the reactor: propylene/ethylene/hydrogen=63.0/28.6/1.41, amount of polymer particles held in the fluidized bed: 50 kg, and reactor operation time: 16 h. Oxygen (deactivator) was added to the supplied gases in an amount corresponding to 0.035 mol per mole of triethylaluminum supplied to the reactor. The average retention time of polymer particles (propylene-ethylene block copolymer) in the reactor was 2.97 h. The polymer particles were discharged at 16.6 kg/h. The particles had an intrinsic viscosity of 1.48 dl/g, and a heat of fusion of 85.9 J/g. The content of propylene units was 91.4 wt. %. The bulk density of the polymer particles was 0.437 g/cm$^3$.

Comparative Example 3

A solid catalyst component and a slurry of a prepolymerized catalyst component were prepared by the same method as in Example 1. By using the slurry, three-stage propylene homopolymerization was performed stage by stage in different reactors to produce polypropylene particles. One-stage copolymerization of propylene and ethylene was then performed in the presence of the polypropylene particles to produce a propylene-ethylene block copolymer. Each polymerization process will be described below in detail.

First Propylene Polymerization (Liquid-Phase Polymerization)

Homopolymerization of propylene was carried out using a vessel type reactor equipped with a stirrer and having a capacity of 40 L. Specifically, propylene, hydrogen, triethylaluminum, cyclohexylethyldimethoxysilane, and the slurry of the prepolymerized catalyst component were continuously supplied to the reactor. The reaction conditions were as follows: polymerization temperature: 78° C., stirring rate: 150 rpm, liquid level in the reactor: 18 L, supply rate of propylene: 11 kg/h, supply rate of hydrogen: 80 NL/h, supply rate of triethylaluminum: 41.0 mmol/h, supply rate of cyclohexyleth-yldimethoxysilane: 6.0 mmol/h, supply rate of slurry of prepolymerized catalyst component (calculated as solid catalyst component): 0.440 g/h, and reactor operation time: 12 h. The average retention time of the slurry in the reactor was 0.67 h. The polypropylene particles were discharged at 4.9 kg/h. The intrinsic viscosity of the particles was 0.90 dl/g.

Second Propylene Polymerization (Liquid-Phase Polymerization)

The slurry obtained by the first propylene polymerization was continuously transferred to another vessel type reactor, propylene and hydrogen were continuously supplied to this reactor to further perform homopolymerization of the propylene. The reaction conditions were as follows: polymerization temperature: 75° C., stirring rate: 150 rpm, liquid level in the reactor: 80 L, supply rate of propylene: 16 kg/h, supply rate of hydrogen 75 NL/h, and reactor operation time: 12 h. The average retention time of the slurry in the reactor was 1.36 h. The polypropylene particles were discharged at 10.9 kg/h. The intrinsic viscosity of the particles was 0.90 dl/g.

Third Propylene Polymerization (Liquid-Phase Polymerization)

The slurry obtained by the second propylene polymerization was continuously transferred to yet another vessel type reactor, and homopolymerization of propylene was further performed. No hydrogen was supplied to the reactor. The reaction conditions were as follows: polymerization temperature: 68° C., stirring rate: 150 rpm, liquid level in the reactor: 80 L, supply rate of propylene: 2.5 kg/h, and reactor operation time: 12 h. The average retention time of the slurry in the reactor was 1.38 h. The polypropylene particles were discharged at 13.8 kg/h. The particles had an intrinsic viscosity of 0.90 dl/g, and a heat of fusion of 110.0 J/g.

First Copolymerization (Gas-Phase Polymerization)

Polypropylene particles obtained from the third propylene polymerization were continuously transferred to a fluidized-bed reactor equipped with a stirrer and having a capacity of 1 m$^3$. Propylene, ethylene, and hydrogen were continuously supplied to the reactor, and copolymerization of propylene and ethylene was performed. The reaction conditions were as follows: polymerization time: 70° C., polymerization pressure: 1.8 MPa, blow rate of circulation gas: 140 m$^3$/h, concentration ratio (vol. %) of gases inside the reactor: propylene/ethylene/hydrogen=63.4/29.0/1.49, amount of polymer particles held in the fluidized bed: 50 kg, and reactor operation time: 16 h. Oxygen (deactivator) was added to the supplied gases in an amount corresponding to 0.072 mol per mole of triethylaluminum supplied to the reactor. The average retention time of polymer particles (propylene-ethylene block copolymer) in the reactor was 2.86 h. The polymer particles were discharged at 17.5 kg/h. The particles had an intrinsic viscosity of 1.46 dl/g, a heat of fusion of 86.9 J/g. The content of propylene units was 91.4 wt. %. The bulk density of the polymer particles was 0.431 g/cm$^3$.

Figure 2:
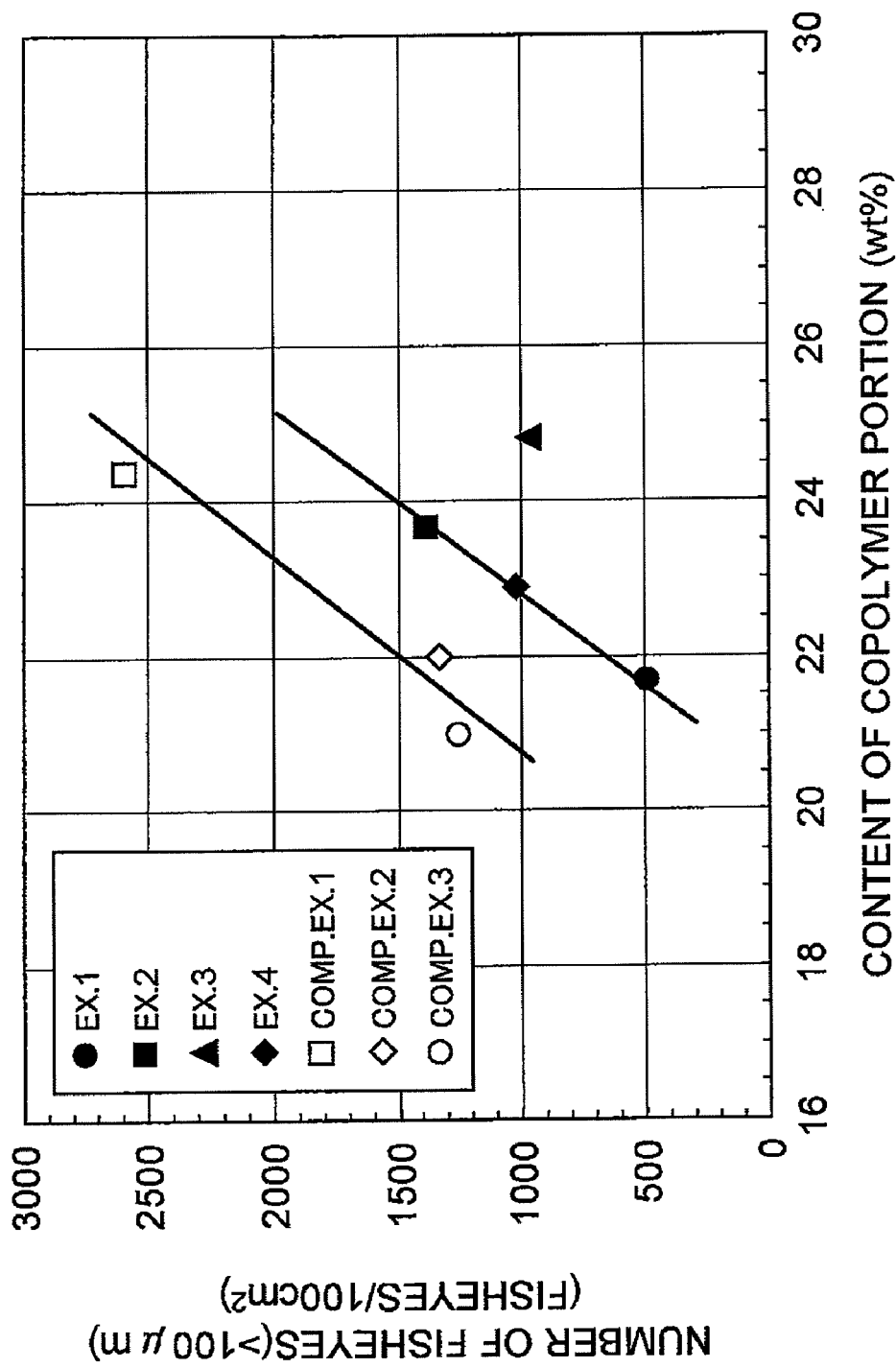
FIG. 2 is a diagram showing the relationship between the content of the copolymer portion in a propylene-ethylene block copolymer and the number of fisheyes having a diameter of equal to or larger than 100 μm.

The results obtained in measuring and evaluating properties in Examples 1 to 4 and Comparative Examples 1 to 3 are shown in Table 1. In FIG. 2, the number of fisheyes having a diameter of equal to or larger than 100 μm is plotted against the content of a copolymer. It is generally believed that the greater the content of a copolymer portion is, the more fisheyes are formed. As shown in FIG. 2, however, the propylene-ethylene copolymers obtained by the method of the present invention have an effect of inhibiting the formation of fisheyes in a molded product. It is also shown that addition of tetraethoxysilane to the first copolymerization reactor reduced fisheyes appearing in molded products.

TABLE 1

|  |  | Ex. 1 | Ex. 2 | Ex. 3 | Ex. 4 | Comp. Ex. 1 | Comp. Ex. 2 | Comp. Ex. 3 |
| --- | --- | --- | --- | --- | --- | --- | --- | --- |
| Supply rate of solid catalyst (g/h) | | 0.704 | 0.704 | 0.740 | 0.573 | 0.416 | 0.396 | 0.44 |
| Addition of tetraethoxy silane to copolymer portion | | No | No | Yes | No | No | No | No |
| Average retention time (hr) of particles in propylene polymerization reaction tank | First stage | 0.30 | 0.30 | 0.30 | 0.30 | 0.31 | 0.32 | 0.67 |
| | Second stage | 0.69 | 0.69 | 0.67 | 0.67 | 1.84 | 1.82 | 1.36 |
| | Third stage | 0.71 | 0.71 | 0.70 | 1.31 | 0.68 | 1.79 | 1.38 |
| | Total | 1.70 | 1.70 | 1.67 | 2.28 | 2.83 | 3.93 | 3.41 |
| Average retention time of particles in copolymerization reaction tank (hr) | | 2.42 | 2.82 | 2.93 | 2.93 | 2.63 | 2.97 | 2.86 |
| Content of copolymerized portion (wt. %) | | 21.7 | 23.7 | 24.8 | 22.9 | 24.4 | 22.0 | 21.0 |
| Number of fisheyes (fish eyes/100 cm$^2$) | Fisheyes with a diameter equal to or larger than 100 μm | 493 | 1381 | 976 | 1027 | 2592 | 1339 | 1252 |
| | Fisheyes with a diameter equal to or larger than 200 μm | 74 | 222 | 232 | 219 | 567 | 283 | 235 |
| Amount of produced propylene-ethylene block copolymer (parts by weight) when the amount of supplied of solid catalyst is taken as 1 part by weight | | 26989 | 27983 | 25405 | 32810 | 41106 | 41919 | 39773 |

What is claimed is:

1. A method for producing a propylene-ethylene block copolymer, comprising:
   a first polymerization process which is performed using two or more polymerization tanks connected in series and in which a solid catalyst or a prepolymerized catalyst containing a solid catalyst, and propylene are continuously supplied to a first polymerization tank to produce polypropylene particles containing the solid catalyst, and propylene and polypropylene particles continuously extracted from a former polymerization tank are continuously supplied to a second or following polymerization tank, so that each of the polypropylene particles is grown; and
   a second polymerization process in which propylene, ethylene, and polypropylene particles continuously extracted from the last polymerization tank of the first polymerization process are supplied to a polymerization tank to produce a copolymer of propylene and ethylene within the polypropylene particles,
   wherein an average retention time of the polypropylene particles in each polymerization tank of the first polymerization process is 0.1 to 1.5 h and the sum total of average retention times of the polypropylene particles in the polymerization tanks of the first polymerization process is 1.5 to 3.0 h,
   wherein a silicon compound represented by Formula [1] is supplied to the polymerization tank of the second polymerization process:

$$Si(OL)_4 \quad [1]$$

wherein L is independently in each occurrence a monovalent hydrocarbon group having 1 to 20 carbon atoms,
   wherein the weight of the propylene-ethylene block copolymer obtained through the first and second polymerization processes is 20,000 to 40,000 parts by weight, where the amount of the solid catalyst supplied per unit time to the first polymerization tank is let be 1 part by weight.

2. The method for producing a propylene-ethylene block copolymer according to claim 1, wherein the average retention time of polypropylene particles in each polymerization tank of the first polymerization process is equal to or less than 1.2 h.

* * * * *